(12) United States Patent
Murr (10) Patent No.: US 10,374,405 B2
(45) Date of Patent: Aug. 6, 2019

(54) METHOD FOR SECURING A SECURING CLAMP ON A CABLE OF AN OVERHEAD TRANSMISSION LINE, MANIPULATOR AND SECURING CLAMP

(71) Applicant: Richard Bergner Elektroarmaturen GmbH & Co. KG, Radebeul (DE)

(72) Inventor: Manfred Murr, Ansbach (DE)

(73) Assignee: Richard Bergner Elektroarmaturen GmbH & Co. KG, Radebeul (DE)

( * ) Notice: Subject to any disclaimer, the term of this patent is extended or adjusted under 35 U.S.C. 154(b) by 203 days.

(21) Appl. No.: 15/228,442

(22) Filed: Aug. 4, 2016

(65) Prior Publication Data

US 2016/0344174 A1 Nov. 24, 2016

Related U.S. Application Data

(63) Continuation of application No. PCT/EP2015/052235, filed on Feb. 4, 2015.

(30) Foreign Application Priority Data

Feb. 4, 2014 (DE) ........................ 10 2014 201 999

(51) Int. Cl.
*H02G 7/08* (2006.01)
*H02G 7/12* (2006.01)
*H02G 7/14* (2006.01)

(52) U.S. Cl.
CPC ................. *H02G 7/08* (2013.01); *H02G 7/12* (2013.01); *H02G 7/14* (2013.01); *Y10T 29/49826* (2015.01)

(58) Field of Classification Search
CPC ... H02G 7/08; H02G 7/14; H02G 7/12; Y10T 29/49826
See application file for complete search history.

(56) References Cited

U.S. PATENT DOCUMENTS 6,298,549 B1 * 10/2001 Mangone, Jr. .......... E04C 5/162
  24/543
6,448,503 B1 * 9/2002 McKinnon ............... H02G 7/12
  174/146

(Continued)

FOREIGN PATENT DOCUMENTS

DE   91 12 701 U1   12/1992
DE   100 19 308 A1   10/2001

(Continued)

*Primary Examiner* — Bayan Salone
(74) *Attorney, Agent, or Firm* — Muncy, Geissler, Olds & Lowe, P.C.

(57) ABSTRACT

A method for securing a securing clamp to a cord or a freeline. The securing clamp is automatically secured to the cord using a manipulator, the manipulator has an assembly mechanism that is used to secure the securing clamp to the cord. The securing clamp has two brackets which can be adjusted relative to each other and which can be converted from an open position into a closed position, i.e. the cord-clamping position. The two brackets can be clamped against each other without screws for a simple assembly, and the securing clamp further has an actuating mechanism via which the two brackets can be converted from the open position into the closed position. To convert the position of the brackets, an actuating arm simply needs to be folded over or a blocking element simply needs to be removed. This is carried out automatically using the assembly mechanism of the manipulator.

28 Claims, 4 Drawing Sheets

(56) References Cited

U.S. PATENT DOCUMENTS

| | | | | |
|---|---|---|---|---|
| 6,606,786 B2* | 8/2003 | Mangone, Jr. | .......... | E04C 5/162 |
| | | | | 24/543 |
| 7,900,325 B1* | 3/2011 | Mangone, Jr. | ........ | F16L 3/1075 |
| | | | | 24/543 |
| 8,713,784 B2* | 5/2014 | Mangone, Jr. | .......... | B25B 31/00 |
| | | | | 140/113 |
| 2010/0218360 A1* | 9/2010 | Mangone, Jr. | .......... | B25B 31/00 |
| | | | | 29/525.01 |

FOREIGN PATENT DOCUMENTS

| | | |
|---|---|---|
| DE | 101 63 679 C1 | 9/2003 |
| DE | 10 2009 034 340 A1 | 2/2010 |
| EP | 0 379 446 A1 | 7/1990 |
| FR | 2 961 032 A1 | 12/2011 |
| GB | 2 139 825 A | 11/1984 |
| JP | H 11-32419 A | 2/1999 |
| WO | WO 00/27009 A1 | 5/2000 |

\* cited by examiner

METHOD FOR SECURING A SECURING CLAMP ON A CABLE OF AN OVERHEAD TRANSMISSION LINE, MANIPULATOR AND SECURING CLAMP

This nonprovisional application is a continuation of International Application No. PCT/EP2015/052235, which was filed on Feb. 4, 2015, and which claims priority to German Patent Application No. 10 2014 201 999.0, which was filed in Germany on Feb. 4, 2014, and which are both herein incorporated by reference.

BACKGROUND OF THE INVENTION

Field of the Invention

The invention relates to a method for securing a securing clamp on a cable, in particular an overhead transmission cable. The invention further relates to a manipulator and a securing clamp for securing on a cable.

Description of the Background Art

In transmission lines, usually transmission line cables are stretched between, for example, anchor points formed by masts. The transmission lines in this respect are conductors for transporting electrical power, but may also be data cables. The anchor points are often spaced several hundred meters apart. Because of this large spacing, it is required that for purposes of protection, objects of different kinds need to be mounted to the cables of the transmission lines. Thus, usually several conductors are interconnected via so-called field spacers via which the individual conductors are held at a defined distance to each other. Such a field spacer can be seen for example from the German utility model DE 91 12 701 U1.

To avoid undesirable vibrations, it is also known to attach so-called vibration dampers. The vibration dampers themselves in this case include and preferably consist of, for example, an elongated element, in particular a damper cable, which is attached via a damper clamp on the cable of the transmission line. Such a damper clamp can be seen for example from DE 101 63 679 C1.

Further, ice deposition causes problems, which, for example, leads to a twisting of the transmission line cable. To avoid this, so-called torsion pendulums are also attached to the respective cable, as can be seen for example from DE 10 2009 034 340 A1.

In addition, other elements are attached to the cable, such as reflectors, for purposes of protecting or repelling birds.

For all these protective objects, a secure and reliable attachment to the cable of the transmission line, in particular to the transmission conductor, is required. To ensure this, conventional securing clamps are designed from two clamping brackets that are bolted together by a screw so that reliable clamping is achieved.

Such a securing clamp is known for example from DE 101 63 679 C1 or also from DE 91 12 701 U1. Moreover, helically wound fixing rods are, for example, known as suspension devices for transmission lines which are guided around the transmission conductor and through a retaining clamp, as can be seen, for example, from DE 100 19 308 B4.

All these clamps, however, require a relatively high assembly effort, which leads to high installation costs. This is in particular, for example, connected with considerable costs in respect of retrofit measures for bird protection purposes.

SUMMARY OF THE INVENTION

It is therefore an objection of the invention to enable a simple and cost-effective installation of securing brackets on a cable, in particular a transmission line.

In an exemplary embodiment, a method is provided for securing a securing clamp on a cable, in particular a transmission line. For this purpose, a manipulator can be and preferably is provided, by means of which a respective securing clamp is automatically secured to the cable, i.e., mechanically, without any manual actuation of the securing clamp by a technician being required. The manipulator can comprise an assembly mechanism, which is designed for the automatic assembly and operation of the securing clamp. By means of the automated attachment, the assembly effort is considerably less, since, firstly, a respective technician no longer needs to access the cable. It is therefore no longer required in the open field that operating personnel manually secure the individual objects to the cables of the transmission line. Especially with a live power line, this is of particular advantage. Firstly, because in particular, existing transmission lines are accessible often only with effort. Furthermore, installation can also be done in a live state by means of the manipulator without requiring a shutdown of the live transmission line.

Expediently, functional elements such as vibration dampers, line markings and/or field spacers are secured on the cable together with the securing clamps. These functional elements can be and preferably is pre-assembled on the securing clamps.

In an embodiment, the securing clamp has two mutually adjustable brackets, namely a main bracket and a closing bracket, and an actuating arm. Via the actuating element, the brackets are automatically transferred from an open to a closed, cable-clamping position. The actuating arm is actuated by means of the assembly mechanism.

The two brackets can be and preferably are clamped against each other without screws, so that therefore a simple, in particular mechanical, activation and conversion to the closed position is provided. Overall, the actuation of the activating mechanism can be and preferably is carried out automatically using the manipulator. Due to the simple locking mechanism, it is possible to automatically secure transmission line objects on a cable.

The securing clamp can be and preferably is guided by means of the manipulator in an open position to the cable, encompassing it, wherein in particular the main bracket is hooked onto the cable. Subsequently, the two brackets are clamped against each other by means of the actuating element, by means of which the two brackets are transferred from the open to the closed, cable-clamping position. The brackets are, for example, mechanically biased, and the actuating element is a locking member, after which removal, the brackets are designed to automatically enter in the closed position.

The actuating element can be and preferably is designed in particular as an actuating mechanism, i.e., it has mechanical elements such as levers or brackets, etc. The actuating element is activated by the assembly mechanism so that the clamp enters into the closed state. Other actuating elements such as small explosives, thermally or electrically activated actuating arms, are also possible. The assembly mechanism therefore actuates the actuating arm, and in particular a mechanism in the narrow sense, includes and preferably consists of mechanical components.

In addition, it is provided that also the approach of the securing clamp to the cable is done automatically by the manipulator. Overall, therefore, the securing of the securing clamp and thus the objects on the cables of the transmission line, occurs fully automatically without any manual intervention being required. To make this possible, it is particularly provided that the manipulator automatically drives up to a respective securing position on the cable. For this purpose, the manipulator in particular comprises a drive unit for the automatic movement.

Conveniently, the manipulator carries a plurality of securing clamps, in particular a sufficient number, for example, more than 10 pieces, in order to secure all required/desired securing clamps and functional elements between two anchor points of a transmission line. Therefore, the manipulator has a storage or supply line where the individual securing clamps are stored, for example, with the objects already disposed thereon, such as bird protection elements, damping elements.

The manipulator can be and preferably is designed for the substantially simultaneous or simultaneous securing of several securing clamps on a plurality of adjacent cables, in particular for securing field spacers between the cables of a bundle. For a field spacer, it is required that via the securing clamps, several cables combined to form a bundle are joined together. For example, at least one and preferably several pre-assembled field spacer devices are stored in the manipulator, which are then secured with individual vertices via securing clamps to the cables.

According to an embodiment, the manipulator can be and preferably is formed like a trolley that is self-propelled along the cable. At defined positions, for example, at periodic intervals of several meters, a respective securing clamp is then initially hooked on the cable by the main bracket and then clamped there using the actuating mechanism.

As an alternative to the trolley, it is also possible that the manipulator can be and preferably is designed like a drone, i.e., as a remote-controlled flying object. In particular, the drone allows for installation without mandatory shutdown of the transmission line.

The automatic securing concept described herein using a manipulator designed especially as a trolley or a drone is carried out by means of clamping with a securing clamp without screws. With a suitable design of the assembly mechanism of the manipulator, by means of which the automated assembly of the securing clamp is carried out, the securing clamp is, for example, also designed as a screw clamp or a helical rod which must be wound on the cable and around a retaining element.

The object is further achieved by a manipulator for carrying out the method described above.

The object is further achieved by a securing clamp that serves for securing an object on a cable of a transmission line and has two mutually adjustable brackets, which are referred to below as the main bracket and the closing bracket. From an open position in which the brackets define between them an insertion opening that is greater than or equal to a diameter of the cable, the two brackets can be transferred to a closed, cable-clamping position. With respect to the simplest possible assembly, the two brackets can be clamped against each other without screws, and to supplement the two brackets, the securing clamp has an additional actuating mechanism through which the two brackets can be transferred from the open to the closed position. The two brackets are usually held together for pivotal movement.

Using the actuating mechanism, the two brackets can be transferred into the clamping position in a simple manner without requiring any screwing action. The actuating mechanism is designed such that the two brackets are transferred into the clamping position by a simple actuation movement, such as actuating only one actuating arm. At the same time, the actuating mechanism is also designed to secure the bracket in the clamping position.

The main bracket usually has in this case a securing point for securing the object, which is to be secured to the cable. The securing point can be, for example, a lug. Furthermore, the main bracket can be and preferably is designed such that using the main bracket, the entire securing clamp can be loosely hooked on the cable during installation and is then held self-supporting, i.e., without further holding means on the cable. During assembly, therefore, no separate holding or securing clamp is required during assembly in an advantageous embodiment. The main bracket has for this purpose a claw or hook-shaped cable receiving. The securing location for the object is typically arranged opposite, in such a way that the focus of the entire securing clamps—optionally with pre-affixed object—pulls the main bracket toward the cable so that the main bracket is securely hooked. In contrast to simple half-shell configurations, this makes installation much easier.

Overall, the simplified attachment of the securing clamp allows for an automated securing of the securing clamp on the cable so that this can take place fully automatically without manual assistance is also carried out.

With regard to the simplest possible actuation, in an embodiment, the actuating mechanism comprises a lever mechanism having an actuating arm via which the two brackets are transferred to the closed, clamping position. The two brackets are in particular connected to one another mutually via the lever mechanism. The lever mechanism usually has in this case at least two lever arms, which are hinged together. The lever mechanism is therefore multisectional. Via such a lever mechanism, the bracket can easily be transferred into the clamping position by a simple folding over of one of the lever arms, which is called the actuating arm. The lever mechanism can also be and preferably is designed such that it secures the two brackets in the closed, clamping position.

In an embodiment of the lever mechanism, the mechanism can be and preferably is configured as an articulated lever in the manner of a double lever and can have two lever arms that are pivotally connected to one another as well as in each case on one of the brackets, wherein one of the lever arms at the same time forms the actuating arm. To this end, the fulcrum of this lever arm, via which the arm is supported on its associated bracket, is arranged in a central region of the lever arm. The protruding end then forms the actuating arm.

The actuating arm can be and preferably is eccentrically mounted via an eccentric mechanism so that due to the eccentric design, it presses the brackets to the closed position during a pivoting movement for transferring these to the closed position. Due to the eccentric design, therefore, at least at the end of the closing movement, the required clamping force is applied. Overall, the entire closing movement can take place via the eccentric.

According to an embodiment, the lever mechanism has a tension arm, with which the closing bracket is pulled toward the main bracket. The actuating arm is pivotally connected to the tension arm. The two arms are supported here by the main bracket and the closing bracket. The two arms can be and preferably are guided in each case through the bracket. The actuating arm as projecting lever arm thus virtually protrudes from the one bracket, in particular the main bar, at its rear, and only needs to be pivoted against this in order to convert the closing bracket in the clamping position.

In an embodiment, the actuating mechanism can be and preferably is designed to be self-locking so that a secure holding is ensured in the closed position. Self-locking is understood to be that the actuating mechanism is designed such that a force acting on the two brackets against the closing direction of the bracket leads to an increase in the clamping force with which the two brackets are secured in the closed position.

In an embodiment, the closing bracket can be and preferably is pivotally mounted at a first swivel joint on the main bracket. In addition, the actuating arm is mounted opposite of this first swivel joint of the closing bracket at a second swivel joint on the main bracket. To close the two brackets, the closing bracket is pivoted toward the main bracket and at the same time, the actuating arm is pivoted toward the main bracket, wherein the actuating arm then locks the closing bracket in the closed position. For example, a self-locking can be and preferably is provided. In the closed position, the closing bracket and the actuating arm are oriented at an angle to each other, such, that when exposed to a force against the closing direction, the actuating arm and the closing bracket are clamped against each other. A form-locking element is additionally and conveniently arranged on one of these two elements, which additionally secures the closing position.

In an embodiment, the actuating arm is not pivotally disposed on the main bracket but on the closing bracket opposite the first swivel joint in such a way, that the actuating arm, which can also be and preferably is designed in the manner of a bracket, is guided over the main bracket and in particular, via its upper hook-shaped cable receiving, thereby engaging over the main bracket. At the same time, a closing and clamping mechanism is designed so that the engagement carries out the clamping and securing. The actuating arm is thereby designed in the manner of a buckle or in the manner of a transmission bracket.

In an embodiment, the lever mechanism can be and preferably is designed as a particular self-locking toggle lever mechanism, which holds the bracket, for example the closing bracket and the actuating arm. The toggle lever mechanism in this case comprises in particular two articulated arms, wherein in the closed position, the joint connecting the two articulated arms is in particular self-locking, i.e., inclined such at an angle that a force acting counter to the closing direction only leads to further locking.

In an embodiment, it is provided that at least on one of the brackets, a form-fitting element, for example in the manner of a barb or a locking lug, is formed. This form-fitting element can be and preferably is configured on the main bracket. To close, the closing bracket is transferred in a simple manner to the closed position using the actuating arm and to the point until the closing bracket engages with the end that is associated with the form-fitting element. The closing bracket in turn is hinged to the main bracket, can be arranged at the end of the hook-shaped cable receiving. A protruding lever arm forms the actuating arm. This can be and preferably is merely constructed as a tool engagement, to which, for example, an actuating rod can be inserted or fitted.

In an embodiment, the two brackets are elastic, in particular via a spring element, clamped against one another, wherein the spring effect is oriented in the closing direction, i.e., so that by using the spring, the two brackets can be reliably held in the closed position.

According to an embodiment, the actuating mechanism comprises a blocking element, which holds the two brackets in an open position against the spring force. The spring mechanism acts together with the blocking element such that in a removal of the blocking element, the two brackets quasi snap closed and are thus transferred to the closed position. For assembly, therefore, only removal of the blocking element is required.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The securing clamp 1 has a main bracket 2 and a closing bracket 4, which at a first swivel joint 6 is pivotally mounted on the main bracket 2. The two brackets 2, 4 are, for example, a continuous casting profile, particularly in the embodiments according to the FIGS. 1, 2a, 2b, 7a, 7b. The two brackets 2, 4 are clamped against one another without screws. The main bracket 2 generally has at one end a hook or claw-shaped cable receiving 8 and at its opposite end, a securing element formed in the embodiments as a mounting lug 10. At this end opposite the cable receiving 8, an object 50 to be fixed on the cable 12 is attached to the securing clamp 1.

Figure 1:
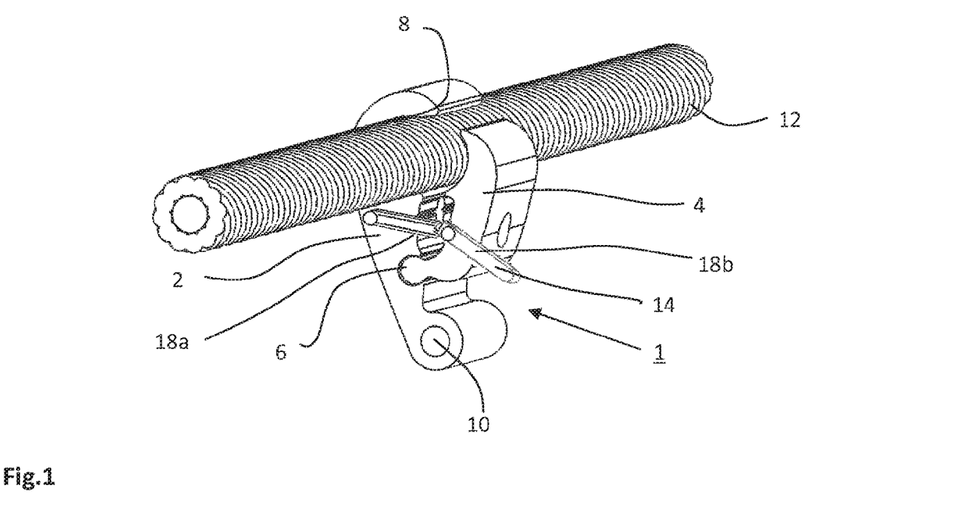
FIG. 1 is a perspective view of a cable, in particular a conductor of a transmission line plus an attached securing clamp.
Figure 2A:
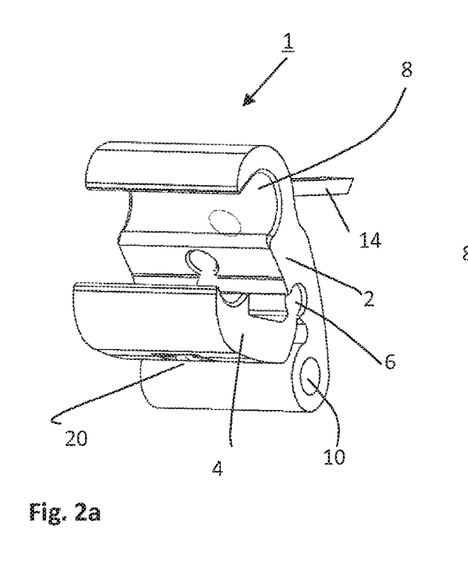
FIG. 2a, 2b are perspective views of an embodiment of the securing clamp.
Figure 2B:
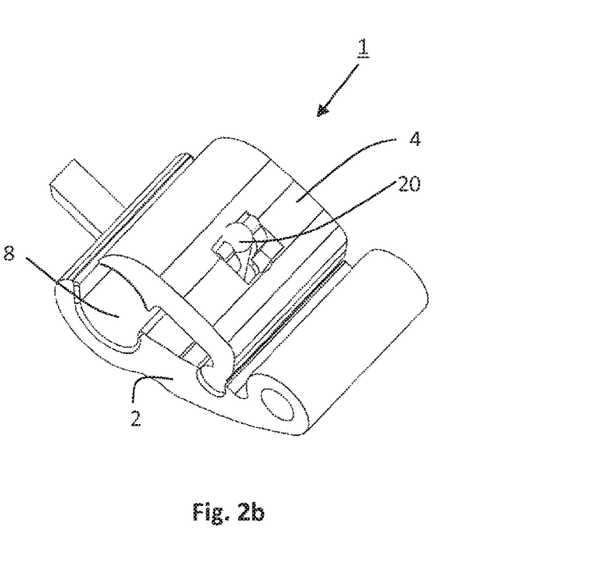

The embodiments of FIGS. 3 to 6 each show an embodiment with a main bracket 2 which is designed relatively elongated and with a pronounced, hook-shaped cable receiving 8. These embodiments can be hung particularly easily on the cable 12. In the embodiments of FIGS. 1, 2 and 7, the main bracket 2 is formed more compact and has a less pronounced cable receiving 8. While in the first group the first swivel joint 6 is formed over a separate hinge pin, in the embodiments of the second-mentioned group, the first swivel joint 6 is formed by a complementary shaping of the two brackets 2, 4, namely on the one hand, an approximately C-shaped receptacle and on the other hand, an end-molded pin. In the latter group, the two brackets 2, 4 are designed as classic continuous casting profiles that are pushed into each other in the area of the first swivel joint 6 in the cable direction and are thereby held non-releasably against one another over the first swivel joint 6. In the embodiment of the first group (FIGS. 3 to 6), this is done via the hinge pins. The individual elements of the securing clamp 1 of this first group are in particular manufactured as single, separate cast elements.

In the open position, both brackets 2, 4 are spaced apart at an insertion opening so that the cable 12 of the transmission line between the brackets 2, 4 may be introduced by radially approaching the cable 12. To facilitate hooking the main bracket 2 during assembly and to ensure that in the open position the securing clamp 1 remains self-supporting, so without further securing elements, on the cable 12 in a pre-assembly position the cable receiving 8 can extend and preferably extends over more than 180°, in particular more than 210°.

In order to transfer the securing clamp 1 from the open to the closed position, an easy operable actuating mechanism is formed in all embodiments. All the different actuating mechanisms illustrated in the various embodiments have in common that by actuation of an actuating element, namely by pivoting an actuating arm 14 or by removing a blocking element 16, the securing clamp 1 is transferred to the closed position and also secured there. The actuating arm 14 is generally a lever arm.

The embodiments of FIGS. 1 to 7 show an actuating mechanism designed as a lever mechanism.

According to the embodiment illustrated in FIG. 1, either on one or both sides of the two brackets 2, 4, an articulated lever is mounted with two lever arms 18a, 18b, wherein the lever arm 18b shown on the right side forms the actuating arm 14. The two lever arms 18a, 18b are each secured hinged to each bracket 2, 4 assigned to them and also hinged to one another. The lever arm 18b attached to the closing bracket 4 in this case has a projecting lever arm portion which forms the actuating arm 14. By actuating the actuating arm 14 downwards, the closing bracket 4 is drawn against the main bracket 2 and thus, the cable 12 is clamped. To secure in the closed position, a trigger lock not shown here is additionally formed, so that a release is made impossible, or only possible with a defined force. The lever arms 18a, 18b are arranged below the cable receiving 8, i.e., in a central region of the main bracket 2, between the cable receiving 8 and the first swivel joint 6.

In the embodiment shown in FIGS. 2a, 2b, the lever mechanism is formed by the actuating arm 14 and a tension arm 20. In addition, in this embodiment, the two arms 14, 18 are not positioned laterally but passed through the brackets 2, 4. Here, too, the actuating arm 14 and the tension arm 20 are placed between the cable receiving 8 and the first swivel joint 6. The tension arm 20 is mounted on the closing bracket 4, as can be seen in particular in FIG. 2. It penetrates both the closing bracket 4 and the main bracket 2 substantially perpendicular to the cable direction. On the back side of the main bracket 2 not recognized in FIG. 2a, the actuating arm 14 is pivotally connected to the tension arm 20 via an eccentric 22 (see for example FIG. 3). In a pivotal movement of the actuating arm 14, therefore, due to the eccentric mounting, a tightening of the closing bracket 4 occurs in the direction of the main bracket 2 to the closed position. To exercise the tension, the actuating arm 14 rests with its eccentric 22 on the main bracket 2. The eccentric 22 is designed such that in the closed position, the actuating arm 14 can only be released again with greater force, that is, the actuating arm 14 snaps into a closed end position due to the special design of the eccentric 22.

Figure 3A:
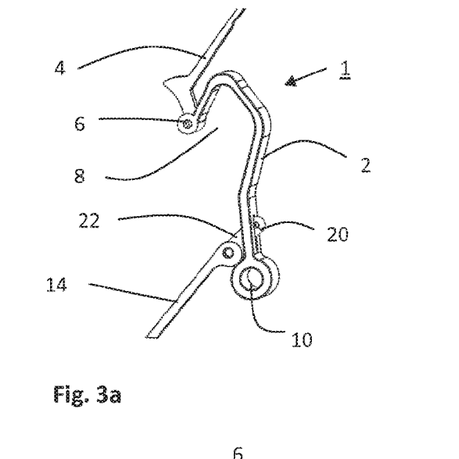
FIG. 3a, 3b illustrate an embodiment of the securing clamp.
Figure 3B:
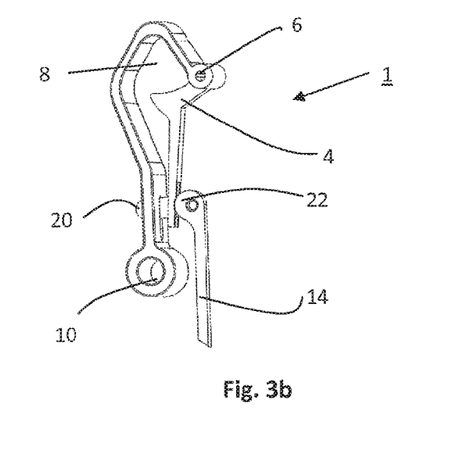

In the embodiment, according to FIGS. 3a, 3b, an embodiment is also shown at the end of the actuating arm 14 with the help of an eccentric 22. The actuating arm 14 of the embodiment of FIGS. 2a, 2b, for example, has an eccentric 22 as can be seen in FIGS. 3a, 3b. Unlike the embodiment of FIGS. 2a, 2b, the tension arm 20 is now mounted on the main bracket 2 and the actuating arm 14 is supported on the closing bracket 4. Another major difference is additionally, that now the first swivel joint 6 is formed at the end of the hook-shaped cable receiving 8 so that the closing bracket 4 is pivotally supported on the main bracket 2 from the top down. The closing bracket 4 has an insertion slot at its lower end with which it is slipped over the tension arm 20 when converting to the closed position.

In this embodiment, the main bracket 2 is therefore initially hooked on the cable 12; subsequently, in a simple manner, for example by a simple abutment, the closing bracket 4 is transferred from the upper position shown in FIG. 3a to the lower position shown in FIG. 3b. Simply due to gravity, the bracket will at least approximately assume the position shown in FIG. 3b. For locking, it is then only still necessary that using the actuating mechanism, the tension arm 20 is pushed up by means of the actuating arm 14 from below into the slot-shaped receptacle on the closing bracket 4, and then the actuating arm 14 is pivoted, so that via the eccentric 22, the closing bracket 4 is pressed in the direction of the main bracket 2. The closing bracket 4 in this embodiment has an upper bracket arm 24 which can be and preferably is designed to clamp the cable 12 with a rounding toward the cable receiving 8. The bracket arm is linked to a closing arm 26 at almost right angles that cooperates as part of the actuating mechanism with the actuating arm 14 and the tension arm 20.

In the embodiments of FIGS. 2a, 2b and 3a, 3b, the tension arm 20 is on the one hand pivotally mounted on the respective brackets 2, 4 and on the other hand, on the actuating arm 14.

Figure 4A:
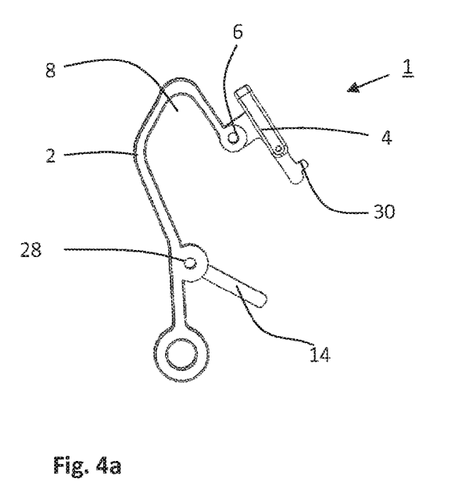
FIG. 4a, 4b illustrate an embodiment of the securing clamp.
Figure 4B:
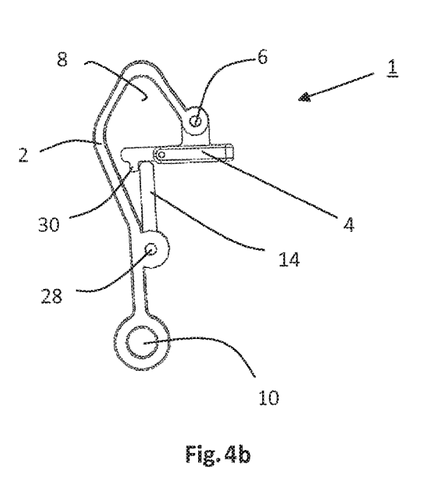

In the embodiment of FIGS. 4a, 4b, the closing bracket 4 is in turn pivotally mounted at the end of the cable receiving 8. In addition, a second swivel joint 28 is disposed opposite the first swivel joint 6 on the main bracket 2, in particular between the mounting lug 10 and the start of the hook-shaped cable receiving 8, on which the actuating arm 14 is pivotally mounted. FIG. 4a shows the open position. By pivoting both the closing bracket 4 and the actuating arm 14 toward the cable receiving 8, the securing clamp 1 is then transferred to the closed position. Here, first the closing bracket 4 is pivoted, then the actuating arm 14, so that the arm—as can be seen in FIG. 4b—engages behind the underside of the closing bracket 4. Conveniently, closing bracket 4 and actuating arm 14 are oriented at an angle to each other in the closed position. And in such a way, that due to the applied forces, a force effect counter to the closing direction, that is, for example, in the embodiment in the vertical direction downwards towards the mounting lug 10, causes a self-locking. In the embodiment of FIGS. 4a, 4b, additionally a form-fitting element in the manner of a protruding lug 30 is formed on the closing bracket 4, which prevents slipping of the actuating arm 14 towards the main bracket 2.

Figure 5A:
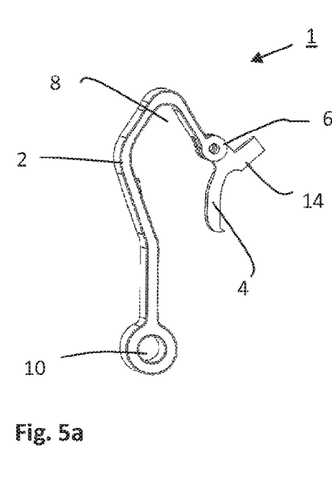
FIG. 5a, 5b illustrate an embodiment of the securing clamp.
Figure 5B:
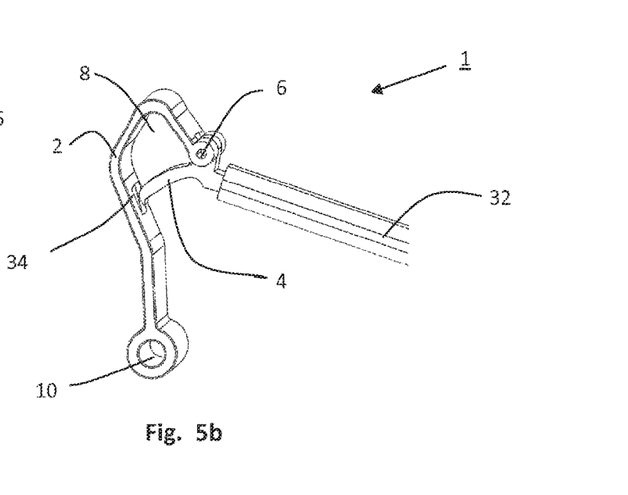

The embodiment according to FIGS. 5a, 5b shows a somewhat modified embodiment as compared to the FIGS. 4a, 4b. In this embodiment, the closing bracket 4 is mounted at the end of the cable receptacle 8 via the first swivel joint 6. However, the actuating arm 14 is now part of the closing bracket 4 and is formed as a lever attachment protruding over the first swivel joint 6. With the use of a tool 32, such as a rod, the closing bracket 4 is transferred from the open position illustrated in FIG. 5a to the closed position shown in FIG. 5b. For securing, a locking or form-locking element is formed on the main bracket 2, configured as a latching lug 34. This is approximately wedge-shaped in cross section with a run-on slope. FIG. 5b shows an intermediate assembly state in which the closing bracket 4 is guided along the run-on slope. In the final assembly position, the closing bracket 4 engages behind the latching lug 34 in a form-fitting manner. The latching lug 34 thus forms a kind of barb.

Figure 6A:
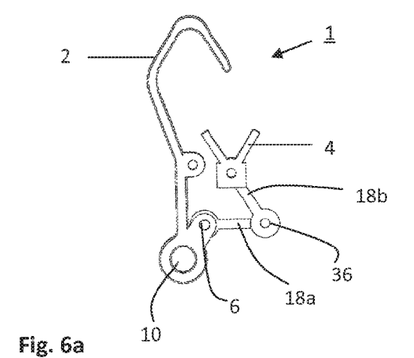
FIG. 6a, 6b illustrate an embodiment of the securing clamp.
Figure 6B:
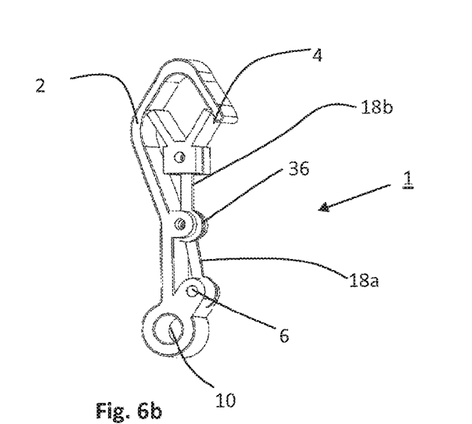
Figure 7A:
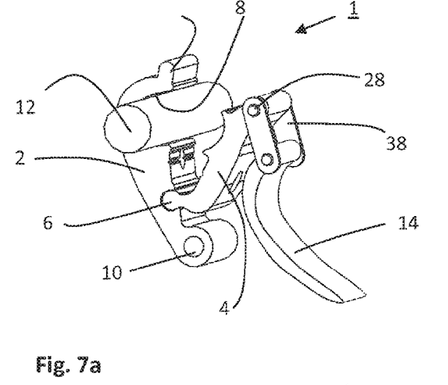
FIG. 7a, 7b illustrate an embodiment of the securing clamp.
Figure 7B:
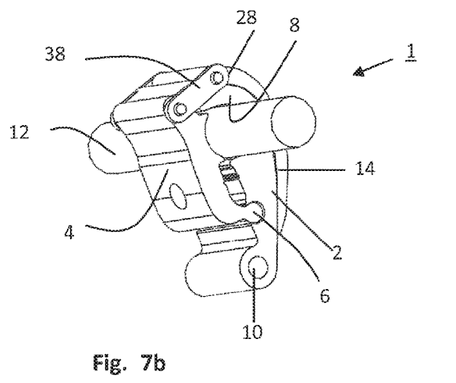

In the embodiment of FIG. 6a, 6b, the closing bracket 4 is arranged at the end of a lever mechanism designed as a toggle lever and itself forms a hinge member of the toggle lever. Via the toggle lever, the closing bracket 4 is articulated indirectly over the first swivel joint 6 on the main bracket 2. The lever mechanism includes two lever arms 18a, 18b for the formation of the toggle lever, wherein the lower lever arm 18a is pivotally mounted on the first swivel joint 6 on the main bracket 2, namely in the embodiment, at its lower end in the region of the mounting lug 10. The two lever arms 18a, 18b are connected together via a toggle link 36. In the open position, which is shown in FIG. 6a, the toggle link 36 is in an angled position, and for conversion into the closing position, is transferred from there into an extended position and, for example, also a hyperextended position. In this overstretched position, again an automatic self-locking is achieved. In addition, there is still the possibility of securing the toggle link in the closed position. For example, a securing pin can be passed through the toggle link 36 and a corresponding lug on the main bracket 2.

According to the embodiment of FIG. 7a, 7b, the first swivel joint 6 is in turn disposed between the cable receiving 8 and the mounting lug 10. In addition, the actuating arm 14 opposite the first swivel joint 6 end of the closing bracket 4 is connected at a second swivel joint 28 with the closing bracket 4. For transferring from the open position (FIG. 7a) to the closed position (FIG. 7b), the actuating arm 14 is pivoted headfirst about the closing bracket 4 and surrounds the main bracket 2 and secures the closed position.

In the embodiment, the actuating arm 14 is designed bipartite like a type of buckle and has a center piece 38 and a folding tab 40, which are pivotally attached to each other. The center piece 38 is formed by two side webs which define a space between them. With this clearance, the actuating arm 14 engages over a retaining web 42 formed on the main bracket 2, protruding upward, against which the actuating arm 14 is clamped in the closed position. When folding the deflecting flange 40, the closing bracket 4 is pulled against the main bracket 2 to achieve the desired clamping effect.

Figure 8A:
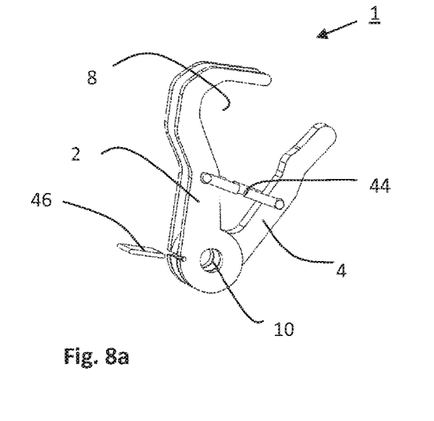
FIG. 8a, 8b illustrate an embodiment of the securing clamp.
Figure 8B:
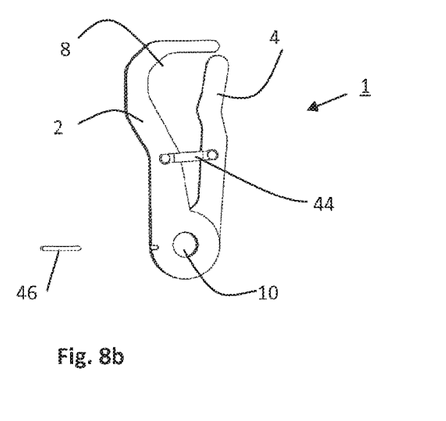

Lastly, in the embodiment of FIGS. 8a, 8b, a spring mechanism is provided, which exerts a spring force towards the closed position. Such a spring mechanism can in principle be used to assist in the other embodiments.

In the embodiment of FIGS. 8a, 8b, a tension spring 44 linking the two brackets 2, 4 is arranged. In order to keep the securing clamp 1 in the open position, as shown in FIG. 8a, a blocking element 46 formed in the embodiment in the manner of a plate is form-fit inserted in the two brackets 2, 4 for blocking. The blocking element 46 prevents the two brackets 2, 4 from jumping to the closed position due to the tension spring 44, as shown in FIG. 8b. During assembly, therefore, in a first step, the securing clamp 1 only needs to be mounted with the main bracket 2 on the cable 12, and then the blocking element 46 is removed. The closing bracket 4 then snaps automatically into the closed position.

With the help of the securing clamp 1, a very simple assembly is generally possible due to the easy-to-use actuating mechanism. In particular, it is provided that the assembly of the securing clamp 1 combined with an object 50 already attached thereto, occurs fully automatically without manual assistance by operating personnel. Such an automated method is exemplified with reference to FIG. 9 to FIG. 11.

Figure 9:
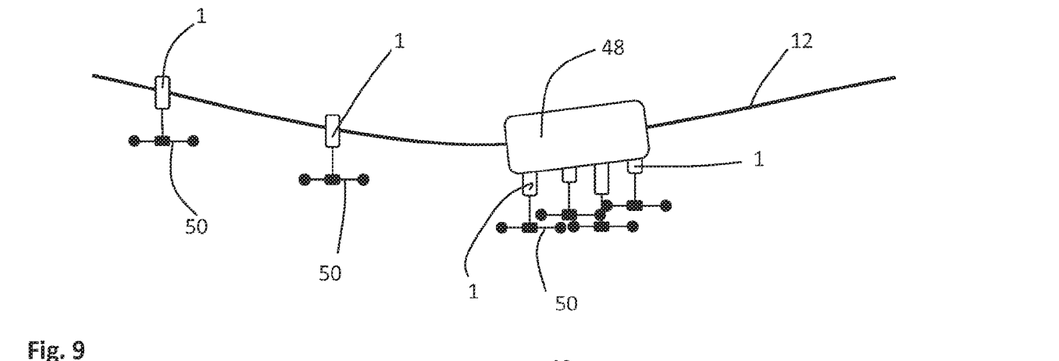
FIG. 9 illustrate an extract of a single cable of a transmission line to illustrate the fully automatic assembly process using a manipulator designed like a trolley.

FIG. 9 shows a section of a transmission line of a single cable 12 between two anchor points, which are typically formed by dead-end towers (not shown). Usually, a plurality of such cables 12, in particular conductors, are anchored between two dead-end towers. Several such cables 12 are typically combined into a bundle conductor and are held together with spacers at a defined distance.

To secure the securing clamps 1, a manipulator 48 is provided, which in the embodiment of FIG. 9. is designed like a trolley that runs along the cable 12 by means of rollers 49. The manipulator 48 is therefore able to automatically progress along the cable 12. Alternatively, it is also possible to use a remote-controlled aerial vehicle (UAV) as a manipulator 48.

The manipulator 48 is designed with a separate drive unit 52 (FIG. 11), for example, a battery-powered electric motor. This drives, for example, at least one of the rollers 49. In addition, the manipulator 48 has a storage compartment 54 for receiving a plurality of securing clamps 1.

Figure 10:
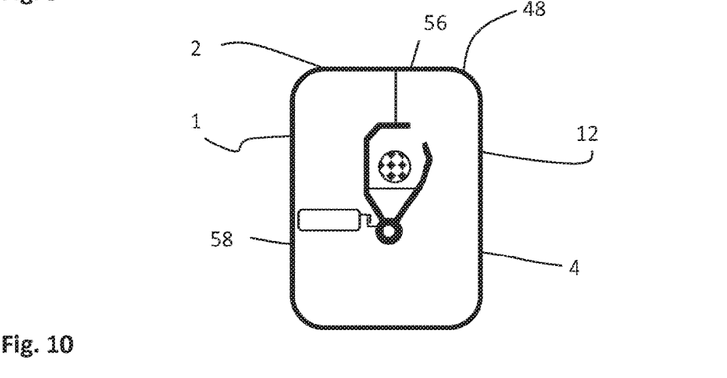
FIG. 10 illustrate a highly schematic illustration of a cross section of a manipulator.

Finally, as the third main element it has an assembly mechanism for an automated pre-guiding of a respective securing clamp 1 to the cable 12 and for automated clamping of the securing clamps on the cable 12. The assembly mechanism has for this purpose suitable elements, such as grippers, actuating motors, etc. FIG. 10 shows an exemplary, and simplistic, releasable assembly mechanism 56 and an actuating mechanism 58 for actuating an actuating element of the securing clamp 1.

The individual securing clamps 1 are aligned adjacent to one another in the manipulator 48 inside the storage compartment 54 in particular in the manner of a supply line. At defined points of the cable 12, for example, at fixed periodic intervals, in a first step, the manipulator 48 causes the securing clamp 1 to be hooked from the supply line to the cable 12. For this purpose, for example, the securing element 1 can be pushed or hooked on the cable 12 in a simple way from the supply line in the longitudinal direction of the cable by means of the assembly mechanism 56.

Figure 11:
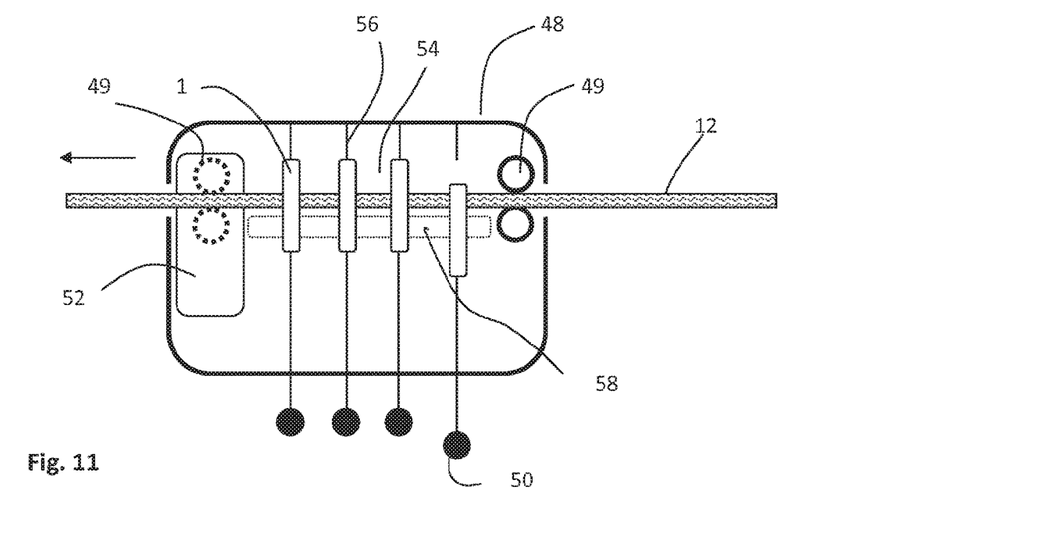
FIG. 11 illustrate a highly schematic illustration of a longitudinal section through a manipulator.

In the exemplified variant of FIGS. 11, 12, the brackets 2, 4 of the securing clamps 1 already loosely surround the cable 12, for example, without touching it. If the manipulator reaches an intended securing position, the holding of the assembly mechanism 56 is released so that the securing clamp 1 is hooked with the main bracket 2 on the cable 12.

In a second step, the assembly mechanics, that is, the actuating mechanism 58, is then activated in order to actuate the actuating mechanism of the securing bracket 4 so that the securing bracket 4 converts fully automatically from the open position into the closed, clamping position. If the securing clamp 1 is a variant in which the two brackets 2, 4 are biased and are locked by a blocking element 16, then merely a release of the blocking element 16 is necessary. This is illustrated in a simplified manner in FIG. 10 by means of a securing clamp 1 according to the type of the variant shown in FIGS. 8a, 8b. The actuating mechanism 58 therefore acts on the blocking element 16, for example by means of a particular hook-like release means. In the other variants of the securing clamp 1, only a simple movement is required due to the simple actuating mechanism. For example, only a folding over of a lever, namely of the actuating arm 14, optionally also the folding over of the closing bracket 4 (for example in the embodiment of FIGS. 3 and 4), is required. These mechanical actuations are initiated by the actuation mechanism 58 in a suitable manner. Other measures for securing the securing clamp 1 are not required and also not provided. Due to the simple securing technique, a reliable automated and hence trouble-free mounting is possible.

With the help of the securing clamps 1, (protective) objects 50 are secured to the cables 12 of a transmission line. These are, in particular, vibration dampers, torsion pendulums and in particular also line markings, for example, as a measure for protecting or repelling birds, such as reflectors. In FIG. 9, a vibration damper or torsion pendulum is exemplified. These objects 50 are also carried by the manipulator 48. They can be and preferably are connected pre-assembled with the securing clamps 1, so that for assembly, only the securing clamps 1 need to be attached to the cable 12.

In the manipulator 48, at least or exactly as many objects 50 with securing clamps 1 can be and preferably are stored, as are to be placed in a field between two dead-end towers.

The objects 50 are alternatively also so-called field spacers. In this case, it is necessary that via the securing clamps 1, several cables 12 combined to form a bundle are connected to each other. The manipulator 48 is designed in this case to simultaneously secure the securing elements 1 on a plurality of parallel cables 12. Usually, a group of cables 12, for example four cables 12, are combined into a bundle and are connected to one another via field spacers. A pre-assembled field spacer device can be and preferably is stored by the manipulator 48, which is then secured to the cables 12 with individual vertices via securing clamps 1. At several vertices, for example, at each vertex, a securing clamp 1 is usually positioned, and the securing clamps are mechanically interconnected. Conveniently, the individual actuating mechanisms of the individual securing clamps 1 are interconnected via a common trigger mechanism, which is actuated by the actuating mechanism 58 of the manipulator.

The securing clamps 1 described herein and the method described are not limited to the field of application of transmission lines in the narrower sense of energized power lines. The concepts described can generally be used for cables, in particular in the open field, which are anchored between anchor points and in particular run at a height of several meters to several 10 meters, where manual assembly and securing is possible only with effort, for example, in lifting platforms, etc.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method of securing a securing clamp to a cable of an overhead transmission line, the method comprising: providing the securing clamp, wherein an element selected from a group consisting of a vibration damper, a line marker and a field spacer is attached to the securing clamp; and attaching the securing clamp, with the element attached thereto, to the cable or in an automated manner using a manipulator, wherein the manipulator comprising an assembly mechanism via which the securing clamp is secured on the cab wherein the manipulator automatically approaches a respective securing position on the cable for securing a respective securing clamp.

2. The method according to claim 1, wherein the securing clamp comprises two mutually adjustable brackets that include a main bracket and a closing bracket, and an actuating element, and the two mutually adjustable brackets are transferred from an open to a closed, cable-clamping position via the actuating element, and wherein the actuating element with the aid of the manipulator is actuated automatically.

3. The method according to claim 2, wherein the two mutually adjustable brackets are clamped against one another without screws.

4. The method according to claim 1, wherein a pre-guiding of the securing clamp to the cable occurs automatically with the aid of the manipulator.

5. The method according to claim 1, wherein that the manipulator has a drive unit for automatic movement.

6. The method according to claim 1, wherein the manipulator carries with it a plurality of the securing clamp that are secured successively on the cable.

7. The method according to claim 1, wherein the manipulator substantially simultaneously secures of a plurality of the securing clamp to a plurality of adjacent cables for securing field spacers between the cables of a bundle.

8. The method according to claim 1, wherein the manipulator is designed in the manner of a trolley which runs along the cable.

9. The method according to claim 1, wherein the manipulator is designed like a drone.

10. The method according to claim 1, wherein the manipulator is remotely controllable, and wherein via a remote control, the movement of the manipulator and/or the securing of a respective securing clamp is initiated.

11. The method according to claim 1, wherein the manipulator is a drive unit for automatic movement, wherein the manipulator carries with it a plurality of the securing clamp that are successively secured on the cable, wherein the manipulator is designed in the form of a trolley or as a drone, which runs along the cable, wherein the securing clamp has two mutually adjustable brackets that include a main bracket and a closing bracket and an actuating element, and via the actuating element, the brackets is transferred from an open to a closed cable-clamping position, wherein the actuating element is automatically actuated via the manipulator, and wherein the actuating element is a blocking member and the brackets are biased and upon removal of the blocking member, the biased brackets automatically move to the closed position or the actuating element has a lever mechanism with an actuating arm via which the two mutually adjustable brackets are transferred to the closed position.

12. A manipulator for carrying out the method according to claim 1, wherein the manipulator has the assembly mechanism for the automatic securing of the securing clamp on the cable.

13. A securing clamp for the method according to claim 1 for securing an object on the cable of the overhead transmission line, the securing clamp comprising:
   two mutually adjustable brackets including a main bracket and a closing bracket that are transferred from an open position into a closed cable-clamping position,
   wherein the two mutually adjustable brackets are clamped against each other without screws, wherein an actuating element is designed as an actuating mechanism and via which the two mutually adjustable brackets are transferred from the open to the closed, clamping position, and wherein the actuating element is pivotally mounted on the closing bracket.

14. The securing clamp according to claim 13, wherein the main bracket has a hook-shaped cable receiving so that the main bracket is suspended self-supporting on the cable.

15. The securing clamp according to claim 13, wherein the actuating mechanism has a lever mechanism comprising an actuating arm, and wherein upon actuation of the actuating arm, the two mutually adjustable brackets are transferred to the closed position.

16. The securing clamp according to claim 13, wherein the two mutually adjustable brackets are pivotally mounted to each other and are connected via an articulated lever comprising two lever arms, which are mounted on each other and on the brackets, and wherein one of the lever arms forms the actuating arm.

17. The securing clamp according to claim 13, wherein the actuating arm is eccentrically mounted such that upon pivotal movement, the actuating arm presses the brackets into the closed position.

18. The securing clamp according to claim 13, wherein the actuating arm is pivotally connected to a tension arm that is supported on one of the brackets, and wherein the actuating arm is supported on the other bracket.

19. The securing clamp according to claim 13, wherein the actuating mechanism is self-locking in the closed position.

20. The securing clamp according to claim 13, wherein the closing bracket is pivotally supported on the main bracket, wherein the actuating arm is mounted opposite to the closing bracket on the main bracket, wherein the actuating arm and the closing bracket are pivotable for transferring into the closed position in the direction of the main bracket, and wherein the actuating arm locks the closing bracket in the closed position.

21. The securing clamp according to claim 13, wherein the closing bracket is pivotally supported on the main bracket, and wherein the actuating element is an actuating arm that is pivotally mounted on the closing bracket on an opposite side such that in the closed position the actuating arm engages over the main bracket and secures the two mutually adjustable brackets to each other.

22. The securing clamp according to claim 15, wherein the lever mechanism is formed by a toggle lever mechanism comprising one of the brackets and the actuating arm.

23. The securing clamp according to claim 13, wherein at one bracket, a form-locking element is arranged that, in the closed position, is engaged from behind by the other bracket, and wherein on one of the brackets the actuating arm is arranged.

24. The securing clamp according to claim 13, wherein the two mutually adjustable brackets are tensioned against each other by a spring mechanism, and wherein a blocking element holds the two mutually adjustable brackets in the open position such that upon removal of the blocking element, the two mutually adjustable brackets automatically transfer into the closed position.

25. The securing clamp according to claim 21, further comprising a centerpiece element, wherein one end of the centerpiece element is pivotally mounted to the closing bracket and a second end of the centerpiece element is pivotally mounted to the actuating arm, such that the actuating arm is pivotally mounted on the closing bracket via the centerpiece element, wherein the actuating arm engages over the main bracket by being folded over the main bracket and wherein one end of the main bracket has a retaining web protruding therefrom, such that the centerpiece element engages with the retaining web when the actuating arm is folded over the main bracket.

26. The securing clamp according to claim 13, further comprising a mounting lug at one end of the main bracket, the mounting lug being a through hole that accommodates the object.

27. The method according to claim 1, wherein the securing clamp comprises an actuating element and two mutually adjustable brackets that include a main bracket and a closing bracket, wherein the two mutually adjustable brackets are transferred from an open to a closed, cable-clamping position via the actuating element, wherein the actuating element, with the aid of the manipulator, is actuated automatically, and wherein the actuating element is pivotally mounted on the closing bracket.

28. The method according to claim 2, wherein the main bracket has a hook-shaped cable receiving and wherein, during installation, the hook-shaped cable receiving is first hooked on the cable and held self-supporting on the cable without a further holding device, and then the two mutually adjustable brackets are transferred from the open to the closed, cable-clamping position via the actuating element.

* * * * *